(12) United States Patent
Siaud et al.

(10) Patent No.: US 12,155,441 B2
(45) Date of Patent: Nov. 26, 2024

(54) METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN THE COMMUNICATION ENTITIES USING THE SAME FREQUENCY CHANNEL

(71) Applicant: Orange, Issy-les-Moulineaux (FR)

(72) Inventors: Isabelle Siaud, Chatillon (FR); Anne-Marie Ulmer-Moll, Chatillon (FR)

(73) Assignee: Orange, Issey-les-Moulineaux (FR)

( * ) Notice: Subject to any disclaimer, the term of this patent is extended or adjusted under 35 U.S.C. 154(b) by 86 days.

(21) Appl. No.: 17/757,763

(22) PCT Filed: Dec. 17, 2020

(86) PCT No.: PCT/FR2020/052512
§ 371 (c)(1),
(2) Date: Jun. 20, 2022

(87) PCT Pub. No.: WO2021/123650
PCT Pub. Date: Jun. 24, 2021

(65) Prior Publication Data
US 2023/0344494 A1 Oct. 26, 2023

(30) Foreign Application Priority Data
Dec. 20, 2019 (FR) ........................ 1915356

(51) Int. Cl.
*H04L 5/00* (2006.01)
*H04B 7/06* (2006.01)

(52) U.S. Cl.
CPC ......... *H04B 7/0632* (2013.01); *H04B 7/0617* (2013.01); *H04L 5/0037* (2013.01); *H04L 5/0069* (2013.01)

(58) Field of Classification Search
CPC ... H04B 7/0632; H04B 7/0617; H04L 5/0037; H04L 5/0069
See application file for complete search history.

(56) References Cited

U.S. PATENT DOCUMENTS 5,603,082 A 2/1997 Hamabe
10,425,881 B2 * 9/2019 Fujishiro ........... H04W 72/0453
(Continued)

FOREIGN PATENT DOCUMENTS

WO WO 2015/082999 A1 6/2015

OTHER PUBLICATIONS

International Search Report for International Application No. PCT/FR2020/052512, dated Mar. 31, 2021.

*Primary Examiner* — Janice N Tieu
(74) *Attorney, Agent, or Firm* — Knobbe, Martens, Olson & Bear, LLP

(57) ABSTRACT

Different frequency channel allocation techniques exist for transmissions. These frequency channel allocation techniques do not explicitly take into account the position of the terminal equipment and the antenna characteristics associated therewith. In addition, these techniques consume significant calculation power in order for the frequency channels to be allocated in the best possible way between the various terminal devices. The communication method is based on the selection of a single current transmission frequency using a metric referred to as metric representative of an overlap of collecting surfaces. The overlap metric evaluates an interference level associated with a spatial overlap between collecting surfaces of a first terminal device (Continued)

and an interfering device for a radio signal transmission frequency.

11 Claims, 3 Drawing Sheets

(56) References Cited

U.S. PATENT DOCUMENTS

| | | | |
|---|---|---|---|
| 2009/0061940 A1* | 3/2009 | Scheinert | H04B 7/022 455/562.1 |
| 2016/0044626 A1* | 2/2016 | Li | G01S 3/14 455/456.1 |
| 2016/0380363 A1 | 12/2016 | Logothetis | |
| 2021/0203410 A1* | 7/2021 | Khan | H04H 40/90 |

* cited by examiner

METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN THE COMMUNICATION ENTITIES USING THE SAME FREQUENCY CHANNEL

CROSS-REFERENCE TO RELATED APPLICATIONS

This application is filed under 35 U.S.C. § 371 as the U.S. National Phase of Application No. PCT/FR2020/052512 entitled "METHOD FOR ALLOCATING RADIO SIGNAL TRANSMISSION FREQUENCIES BETWEEN ONE OR MORE COMMUNICATION ENTITIES, ALLOWING A REDUCTION IN INTERFERENCES BETWEEN SAID COMMUNICATION ENTITIES USING THE SAME FREQUENCY CHANNEL" and filed Dec. 17, 2020, and which claims priority to FR 1915356 filed Dec. 20, 2019, each of which is incorporated by reference in its entirety.

BACKGROUND

Field

The field of the development is that of the allocation of radio signal transmission frequencies. More specifically, the development relates to a technique for allocating radio signal transmission frequencies between one or more communication entities allowing the reduction in interferences.

Description of the Related Technology

There are different techniques for allocating frequency channels for the transmission which exploit, in a given technology, mechanisms referred to as DFS (Dynamic Frequency Selection), or DCA (Dynamic Channel Assignment).

The DFS mechanism is a mechanism associated with Wi-Fi technologies, which assigns dedicated frequency channels to Wi-Fi so as not to interfere with radar systems operating in the same frequency bands. Thus, the DFS mechanism consists in selecting a frequency which does not interfere with radar systems operating in the same frequency band, such as for example the 5 GHz band. The DFS mechanism was developed in the normative document referenced 802.11h and published by the IEEE (Institute of Electrical and Electronics Engineers). The Wi-Fi device detects radar pulses which induce a blocking by a Wi-Fi access point of a transmission channel whose frequency is shared with the radar system at the origin of the transmission of the pulses.

The DCA mechanism is a mechanism relating to the allocation of frequency channels in a multi-cell context. The DCA mechanism dynamically allocates frequency channels within a cell using available frequency channels in adjacent cells. The algorithm is based on the probability of blocking a channel of frequencies within a considered cell and in the adjacent cells allowing reallocating the frequencies of the channels in another cell. The calculation of this blocking probability within the considered cell is based on a hypothesis of frequency channel requests which would follow a Poisson law with a limited number of available frequency channels.

These frequency channel allocation techniques do not explicitly take into account the position of the terminal device and the antenna characteristics associated therewith. In addition, these techniques consume significant calculation power in order to be able to allocate the frequency channels in the best possible way between the different terminal devices.

There is a need for a technique that does not have all or parts of the aforementioned drawbacks.

SUMMARY

The development meets this need by proposing a communication method between a communication device and at least one first terminal device according to a current frequency equal to a first radio signal transmission frequency, the communication method being implemented by the communication device and comprising the following steps:

selection of at least one current radio signal transmission depending on a metric representative of an overlap between a first collecting surface of the first terminal device and a second collecting surface of at least one second terminal device, called interfering device, transmission of a radio signal to one of the two terminal devices at the current frequency.

The development also relates to a communication method between a communication device and at least one first terminal device according to a current transmission frequency equal to a first transmission frequency from several radio signal transmission frequencies, the communication method being implemented by the communication device. The method comprises the following steps:

determination, for a given frequency from the several transmission frequencies, of a metric representative of an overlap between a first collecting surface of the first terminal device and a second collecting surface of at least one second terminal device, called interfering device, selection of a transmission frequency called current transmission frequency from the several radio signal transmission frequencies depending on the determined metric, transmission of a radio signal to one of the two terminal devices at the current frequency.

Such a method is an alternative to the frequency channel allocation techniques of the related art.

The communication method is based on the selection of a single current transmission frequency using a metric referred to as metric representative of an overlap between collecting surfaces. The overlap metric evaluates an interference level associated with a spatial overlap between collecting surfaces of a first terminal device and an interfering device for a radio signal transmission frequency.

The proposed solution relates to the selection of a current radio signal transmission frequency to spatially dissociate adjacent terminal devices using the same radio signal transmission frequency to communicate with the communication device, which allows optimising the frequency resource in a multi-user context. The proposed solution aims at limiting the multi-user interferences and at allowing an adaptation of a receive antenna gain for each point-to-point communication, which limits the single-frequency multi-user interference and contributes to reducing the radiated powers.

The proposed solution consists in selecting a current radio signal transmission frequency used to communicate between the communication device and at least one terminal device in order to avoid an overlapping between the collecting surfaces of the antennas of neighbouring terminal devices. An adjustment of a solid angle of a receive communication beam is performed using the radio signal transmission frequency which modifies the collecting surface of a receive antenna. The described solution is based on the selection of the radio signal transmission frequency which allows generating a collecting surface allowing the establishment of a communication between the communication device and the considered terminal device by limiting the space-frequency interferences with antennas of neighbouring terminal devices.

In a particular implementation of the communication method, a third radio signal transmission frequency is selected and a radio signal is transmitted to the first terminal device at the current frequency and a radio signal is transmitted to the interfering device at the third transmission frequency different from the current frequency and possibly identical to the first frequency.

In a particular implementation of the communication method, the method further comprises:
  determining the metric for another given frequency from the several transmission frequencies,
  selecting another transmission frequency called other current frequency from the several radio signal transmission frequencies depending on the determined metric,
  transmitting a radio signal to the interfering device at the other current transmission frequency,
and wherein the transmission of a radio signal, at the current frequency, is performed to the first terminal device.

After selecting a current frequency, the terminal device and the interfering device each communicate with the communication device according to a transmission frequency which is specific thereto. This contributes to reducing the risks of interference between the two terminal devices.

According to one feature of the communication method, the overlap metric is further determined depending on the relative geometric positions of the terminal device and the interfering device (these relative positions defining a so-called fictitious geometric collecting surface).

According to one feature of the communication method, the overlap metric is a ratio of a fictitious collecting surface, to which the first terminal device and the interfering device belong, to a half sum of the first collecting surface and the second surface of capture.

According to one feature of the communication method, the overlap metric is a ratio of a so-called fictitious collecting surface determined depending on a geometric surface associated with the geometric positions of the first terminal device and the interfering device to a half sum of the first collecting surface and the second collecting surface respectively of the first terminal device and the interfering device.

According to another feature of the communication method, the collecting surface of the first terminal device, or the interfering device, is determined depending on a ratio of a value of a power of the radio signal received by the first terminal device, or by the interfering device, at the first radio signal transmission frequency, to a product of a value of a transmission power of the radio signal and a parameter representative of the directivity of the radio signal transmitted by the communication device In a particular implementation of the communication method, the fictitious collecting surface is determined depending on a geometric surface, determined by means of geometric positions of the first terminal device and the interfering device relative to the communication device, and a fictitious efficiency.

This fictitious collecting surface is calculated by considering the positions of the terminal device and the interfering device expressed in spherical coordinates and by considering the geometric surface of a spherical cap whose axes correspond to the directions of maximum radiation of the terminal device and the interfering device. The fictitious collecting surface is then obtained by multiplying this geometric surface by a fictitious efficiency $\varepsilon_{GF}$ associated with a given type of antenna. In an exemplary embodiment, the fictitious antenna is assumed to be an aperture antenna, which gives a coefficient $\varepsilon_{GF}$~1.

When the overlap metric is less than or equal to a threshold, the method implements said step of selecting the current radio signal transmission frequency.

Indeed, in such a scenario, there is spatial overlap of the radio signals transmitted/received by the terminal device and the interfering device. The selection of a new radio signal transmission frequency is then necessary to dissociate the collecting surfaces of the terminal device and the interfering device.

When the overlap metric is less than or equal to a threshold, the communication method further comprises a step of determining a new value of the overlap metric determined depending on the value of the current radio signal transmission frequency.

If this metric is greater than the set threshold, then the terminal device and the interfering device are spatially dissociated and therefore interfere little or not at all.

When the recovery metric is greater than a threshold, the communication device continues to communicate according to the current radio signal transmission frequency.

Since the terminal device and the interfering device are spatially dissociated and therefore interfere little or not at all, it is not necessary to select a new radio signal transmission frequency.

The development also relates to a method for determining a collecting surface of a terminal device communicating with a communication device according to a current transmission frequency equal to a first radio signal transmission frequency, the method being implemented by the terminal device and comprising the following steps:
  determination of a collecting surface of the terminal device depending on a ratio of a power of a radio signal received by the terminal device at the current radio signal transmission frequency, to a product of a value of a transmission power of the radio signal and a parameter representative of the directivity of the radio signal transmitted by the communication device,
  transmission of the collecting surface of the terminal device thus determined to the communication device.

An object of the development is a communication device capable of communicating with at least one first terminal device according to a current frequency equal to a first radio signal transmission frequency, the communication device comprising means for:
  selecting at least one current radio signal transmission frequency depending on a metric representative of an overlap between a first collecting surface of the first terminal device and a second collecting surface of at least one second terminal device, called interfering device,
  transmitting a radio signal to one of the two terminal devices at the current frequency.

Another object of the development is a terminal device capable of determining a collecting surface allowing a communication with a communication device according to a current transmission frequency equal to a first radio signal transmission frequency, the terminal device comprising means for:

determining a collecting surface of the terminal device depending on a ratio of a value of a power of the radio signal received by the terminal device at the current radio signal transmission frequency, to a product of a value of a transmission power of the radio signal and a parameter representative of the directivity of the radio signal transmitted by the communication device, transmitting the collecting surface of the terminal device thus determined to the communication device.

Another object of the development is a communication device capable of communicating with at least one first terminal device according to a transmission frequency from several radio signal transmission frequencies, the communication device comprising means for:

determining, for a given frequency from the several transmission frequencies, a metric representative of an overlap between a first collecting surface of the first terminal device and a second collecting surface of at least one second terminal device, called interfering device, selecting a transmission frequency called current transmission frequency from the several radio signal transmission frequencies depending on the determined metric, transmitting a radio signal to one of the two terminal devices at the current frequency.

Another object of the development is a terminal device capable of determining a collecting surface allowing a communication with a communication device according to a given transmission frequency from several radio signal transmission frequencies, the terminal device comprising means for:

determining a collecting surface of the terminal device depending on a ratio of a value of a power of the radio signal received by the terminal device at the given radio signal transmission frequency, to a product of a value of a transmission power of the radio signal and a parameter representative of the directivity of the radio signal transmitted by the communication device, transmitting the collecting surface of the terminal device thus determined to the communication device.

Finally, the development relates to computer program products comprising program code instructions for implementing methods as described above, when, when executed by a processor.

The development also relates to a computer-readable recording medium on which computer programs comprising program code instructions, for executing the steps of the methods according to the development as described above, are recorded.

Such a recording medium can be any entity or device capable of storing the programs. For example, the support may include storage means, such as a ROM, for example a CD ROM or a ROM of microelectronic circuit, or else magnetic recording means, for example a USB key or a hard disk.

On the other hand, such a recording medium may be a transmissible support such as an electrical or optical signal, which can be routed via an electrical or optical cable, by radio or by other means, such that the computer programs it contains are remotely executable. The programs according to the development may in particular be downloaded to a network for example the Internet.

Alternatively, the recording medium may be an integrated circuit in which the programs are incorporated, the circuit being adapted to execute or to be used in the execution of the aforementioned methods of the development.

BRIEF DESCRIPTION OF THE DRAWINGS

Other aims, features and advantages of the development will appear more clearly on reading the following description, given by way of a simple illustrative, and not limiting, example in relation to the figures, of which.

DETAILED DESCRIPTION OF CERTAIN ILLUSTRATIVE EMBODIMENTS

Figure 1:
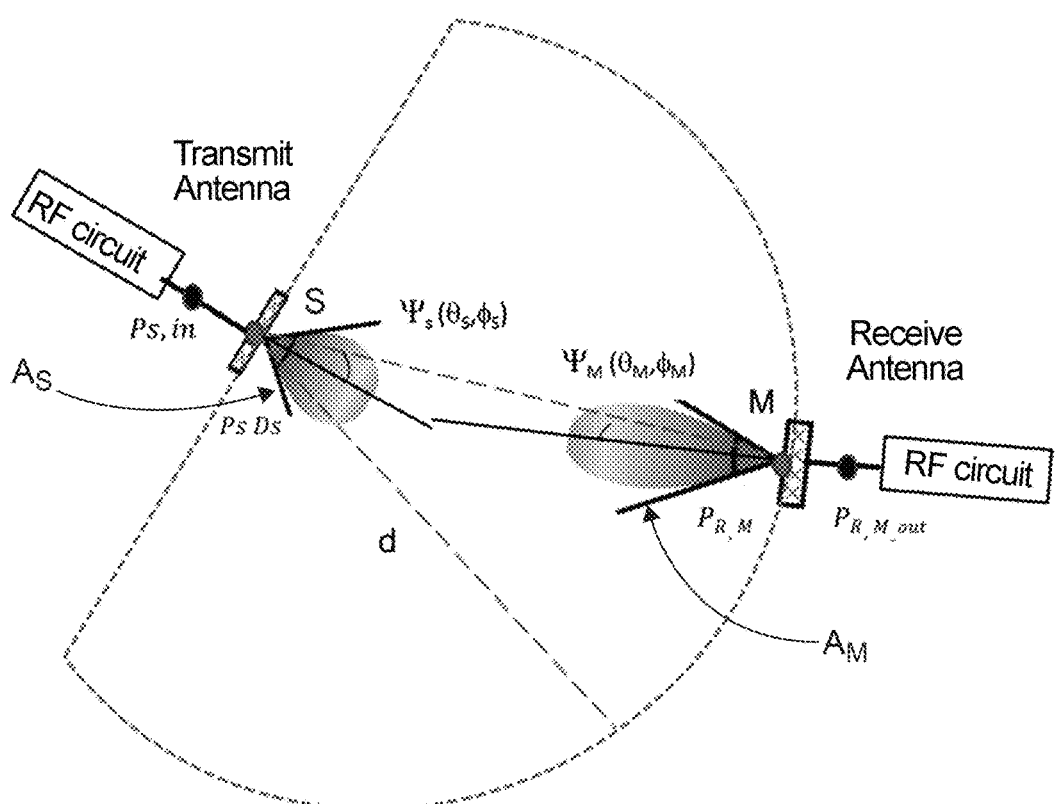
FIG. 1: this figure represents a communication device and terminal device communicating according to a first radio signal transmission frequency.

FIG. 1 represents a communication device S, such as a base station or an access point, and a terminal device M communicating according to a current transmission frequency equal to a first radio signal transmission frequency.

The collecting surface of an antenna $A_M$ of the terminal device M relates to the properties of the receive antenna and its ability to collect the energy of the radio signal transmitted by the communication device S over an effective surface.

The maximum effective surface of an antenna is deduced from the power of the radio signal received at the input of the receiving antenna ($P_{R,M_e}$) and the effective surface is deduced from the power of the radio signal received at the output of this same antenna ($P_{R,M,out}$) taking into account the transmission losses ($\varepsilon_R$) of the antenna $A_M$, also called mismatch losses.

This effective (maximum) surface is called the (maximum) collecting surface of the antenna $A_M$, it depends on the directivity of the receive antenna $A_M$ i.e. the antenna gain, on the direction of the incident radio signal if the transmission is not isotropic and the angular pulsation of the transmitted signal $\omega_c = 2\pi f_c$ where $f_c$ is the current radio signal transmission frequency.

The positions of the terminal device M and that of the communication device S are given in spherical coordinates $(r, \theta, \phi) = (r, \psi)$ relative to the direction of maximum radiation at the terminal device M and to the communication device S. These angles are represented in FIG. 1 for the communication device S $(r, \theta, \phi)_S = (0, \psi_S)$ and for the terminal device M $(r, \theta, \phi)_M = (d, \psi_M)$ where d is the distance between the communication device S and the terminal device M.

The ability of the antenna $A_M$ to collect the energy of the transmitted radio signal depends on the direction of the incident beam, that is to say the directivity of the antenna $A_S$ of the communication device S and the directivity of the antenna $A_M$ of the terminal device M, as well as the distance separating the communication device S and the terminal device M, of the efficiency losses of the antennas $A_S \varepsilon_S$ and $A_M \varepsilon_M$ if the power at the inputs of the antennas ($P_{s,in}$ and $P_{R,M\_out}$) is taken into consideration.

The radiated power density $\rho_{i,s}(d)$ is a radiated power per unit area. At a distance d, the radiated power per unit area is, if the source antenna $A_S$ is isotropic, given by:

$$\rho_{i,S}(d) = \frac{P_s}{4\pi d^2} \quad (1\text{-}1)$$

Where $P_s$ is the power radiated by the communication device S at the output of the antenna $A_S$, d the distance separating the communication device S and the terminal device M and $4\pi d^2$ the surface of the sphere of radius d on which the power is radiated. If the radiation is directional then the radiated power density will be weighted by the directivity of the transmit antenna $A_S$, $D_S(\psi)$, corresponding to a concentration of the radiated power in the solid beam angle of the antenna connecting the communication device S to the terminal device M. This power density at the terminal device M is given by:

$$\rho_{i,S}(\psi, d) = \frac{P_s \cdot D_S(\psi)}{4\pi d^2} = \frac{P_{s,in} \cdot D_S(\psi)}{\varepsilon_S \cdot 4\pi \cdot d^2} = \frac{P_{s,in} \cdot G_S(\psi)}{4\pi \cdot d^2} \quad (1\text{-}2)$$

$G_S(\psi) = \varepsilon_S \cdot D_S(\psi)$ represents the gain of the antenna $A_S$ taking into account the transmission losses $\varepsilon_S$, transmission losses of the antenna connected to the RF circuit, $P_{s,in}$ is the power at the input of the antenna $A_S$, and $D_S(\psi)$ is the directivity of the antenna $A_S$ at transmission in the direction $\psi$.

The received incident power at the input of the antenna $A_M$ depends on the incident power density radiated by the communication device S and which is characterised by a directivity $D_S(\psi_s = \theta_s, \phi_s)$, at a distance d of the communication device S. The reception point being characterised by $M(\psi_M, d)$, the incident power density at the terminal device M depends on the directivity of the antenna $A_S$ at transmission in the transmitter-receiver direction in the vicinity of the position of the terminal device M, i.e. $D_S(\psi_M)$. The incident power density at the terminal device M $\rho_{i,s}(\psi_M, d)$, is expressed as:

$$\rho_{i,S}(\psi_M, d) = \frac{P_s \cdot D_S(\psi_M)}{4\pi d^2} = \frac{P_{s,in} G_S(\psi_M)}{4\pi d^2} \quad (1\text{-}3)$$

The power received at the input of the antenna $A_M$ is the product of the incident power density $\rho_{i,s}(\psi_M, d)$ and the maximum collecting surface of the receive antenna $A_M$ $S_{cmax,M}(f_c, \psi_S)$, taking into account the direction of the radio signal transmitted by the communication device S and the directivity of the antenna $A_M$. In other words, the maximum collecting surface of the antenna $A_M$ depends on the incident direction of the radio signal transmitted on the effective surface of the antenna $A_M$, i.e.:

$$P_{R,M}(\psi_M, d) = \frac{Ps \cdot D_S(\psi_M)}{4\pi d^2} S_{cmax,M}(f_c, \psi_S) \quad (1\text{-}4)$$

$$S_{cmax,M}(f_c, \psi_S) = \frac{\lambda^2}{4\pi} D_M(\psi_S) = \frac{c^2}{4\pi \cdot f_c^2} D_M(\psi_S) \quad (1\text{-}5)$$

The collecting surface of an antenna depends on the directivity of the receive antenna and the current radio signal transmission frequency where $\lambda$ is the wavelength of the transmitted radio signal. $\lambda$ is related to the current radio signal transmission frequency $f_c$ and the speed of light c, $f_c = c/\lambda$.

The gain of an antenna $G_M(\psi)$ is proportional to the directivity of this antenna and takes into account mismatch losses, i.e. $\varepsilon_M$ for the receive antenna when the antenna is connected to an RF circuit.

$$G_M(\psi) = \varepsilon_M D_M(\psi) \quad (1\text{-}6)$$

$$S_{c,M}(f_c, \psi) = \varepsilon_M \cdot S_{cmax,M}(f_c, \psi) = \frac{\lambda^2}{4\pi} G_M(\psi) \quad (1\text{-}7)$$

The power $P_{R,M\_out}(\psi_M, d)$, received at the input of the RF circuit, which takes into account the loss of efficiency of the antenna $\varepsilon_M$ is written:

$$P_{R,Mout}(\psi_M, d) = \frac{Ps \cdot D_S(\psi_M)}{4\pi d^2} \varepsilon_M \cdot S_{cmax,M}(f_c, \psi_S) = \quad (1\text{-}8)$$
$$\frac{Ps \cdot D_S(\psi_M)}{4\pi d^2} S_{c,M}(f_c, \psi_S) = \frac{P_{s,in} \cdot G_S(\psi_M)}{4\pi d^2} S_{c,M}(f_c, \psi_S)$$

The collecting surface of a receive antenna $S_{c,M}(f_c, \psi_S)$ is related to its directivity by the following formula:

$$S_{c,M}(f_c, \psi) = \frac{\lambda^2}{4\pi} \varepsilon_M D_M(\psi) = \frac{c^2}{4\pi \cdot f_c^2} \varepsilon_M D_M(\psi) = \frac{c^2}{4\pi \cdot f_c^2} G_M(\psi) \quad (1\text{-}9)$$

This formula is deduced from the expression of the Poynting vector norm which gives the power density per unit of radiated surface at a distance d from a source and its integration over the solid angle of a beam corresponding to the angle solid through which all the radiated power is concentrated. The equation 1-9 shows that the pickup surface decreases as the current radio signal transmission frequency increases, for a given antenna gain. The collecting surface of an antenna depends on the directivity of the antenna, the direction of the incident radio signal and the current radio signal transmission frequency and collected by the receive antenna. It does not explicitly depend on the distance d. The power density, however, depends on the distance d. The directivity of an antenna provides the angular distribution ($\psi = \theta, \phi$) of the radiation intensity of the antenna.

The total power received by the terminal device M is given by:

$$P_{R,M}(\psi_M, d, \lambda) = \quad (1\text{-}10)$$
$$\frac{Ps \cdot D_S(\psi_M)}{4\pi d^2} \frac{\lambda^2 \cdot D_M(\psi_S)}{4\pi} = Ps \cdot \left(\frac{\lambda}{4\pi d}\right)^2 D_S(\psi_M) \cdot D_M(\psi_S)$$

Which leads to the Friis formula:

$$\frac{P_{R,M}(\psi_M, d, \lambda)}{P_S} = \left(\frac{\lambda}{4\pi d}\right)^2 D_S(\psi_M) \cdot D_M(\psi_S) \quad (1\text{-}11)$$

$$\frac{P_{R,Mout}(\psi_M, d, \lambda)}{P_{S,in}} = \left(\frac{\lambda}{4\pi d}\right)^2 G_S(\psi_M) \cdot G_M(\psi_S) \quad (1\text{-}12)$$

The collecting surface of an antenna can be related to a geometric surface or to a geometric length of the antenna. When it comes to an aperture antenna, such as a horn-type antenna for example, the aperture efficiency of the antenna $\varepsilon_G$ in the direction of the maximum radiation $\psi_0$, is linked to the maximum collecting surface of the antenna by:

$$S_{cmax,M}(f_c, \psi_0) = \varepsilon_G S_G = = > S_{c,M}(f_c, \psi_0) = \varepsilon_G \varepsilon_M S_G$$

where $\varepsilon_G$ can vary between 1 and 0.5, depending on the geometry of the antenna and the expression of the field radiated at the geometric surface of the antenna.

Figure 2:
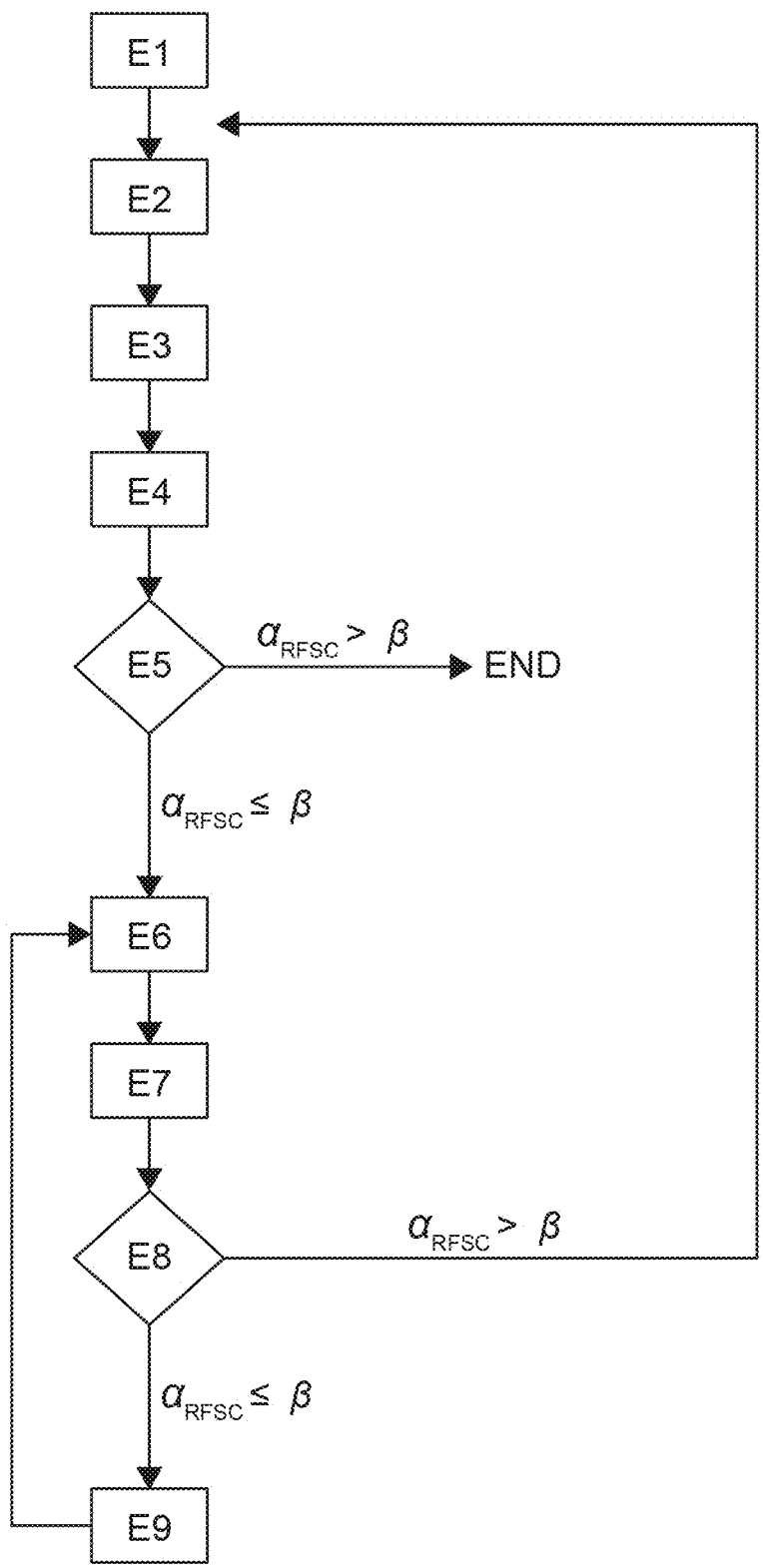
FIG. 2: this figure represents the steps of the methods for communicating and calculating a collecting surface implemented by the communication device and the terminal device.

FIG. 2 represents the steps of the methods of communicating and calculating a collecting surface implemented by the communication device S and the terminal device M.

In a step E1, the source device S transmits a radio signal to the terminal device M and to at least one second terminal device called interfering device I1. Such a radio signal is transmitted at a current transmission frequency equal to a first transmission frequency $f_c$.

In a step E2, which can be implemented either by the communication device S or by each of the terminal devices M and I1, a collecting surface of the terminal device M and of the interfering device I1 is calculated.

Figure 3:
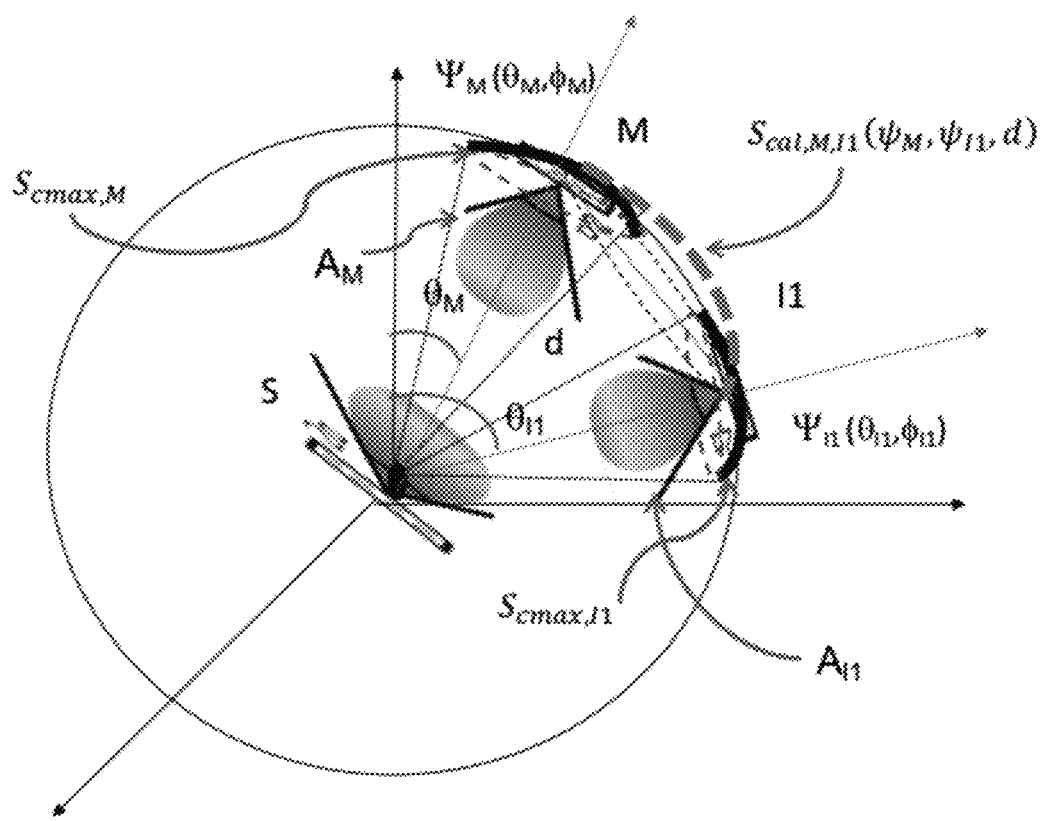
FIG. 3: this figure represents the collecting surfaces of a terminal device and an interfering device.

With reference to FIG. 3, using the power measurement received at the terminal devices M and I1 at the input of the respective antennas $A_M$ and $A_{I1}$ thereof, the maximum collecting surfaces of the terminal devices M and I1 are deduced from the following formula:

$$S_{cmax,M}(f_c, \psi_S) = \frac{P_{R,M}(\psi_M, d)}{P_s \cdot D_S(\psi_M)} \cdot 4\pi d^2 \quad S_{cmax,I1}(f_c, \psi_S) = \frac{P_{R,I1}(\psi_{I1}, d)}{P_s \cdot D_S(\psi_{I1})} \cdot 4\pi d^2 \quad (2\text{-}1)$$

When step E2 is implemented by the terminal devices M and I1, the maximum collecting surfaces thus calculated are transmitted to the communication device S.

When step E2 is implemented by the communication device S, the terminal devices M and I1 transmit power measurements in reception of a received signal or RSSI (Received Signal Strength Indication) to the communication device S so that the latter can calculate the maximum collecting surfaces of the terminal devices M and I1.

In a step E3, knowing the positions of the terminal devices M and I1, that is to say the angles $\psi_M$ and $\psi_{I1}$, assumed to be at the same distance d from the communication device S, the geometric surface of a spherical cap connecting the terminal devices M and I1 is deduced therefrom, using the following formula:

$$S_{cal,M,I1}(\psi_M, \psi_{I1}, d) = 2\pi \cdot d^2 \cdot \sin\left(\frac{\|\theta_M - \theta_{I1}\|}{2}\right) \cdot \left(1 - \cos\left(\frac{\|\theta_M - \theta_{I1}\|}{2}\right)\right) \quad (2\text{-}2)$$

The fictitious collecting surface can be expressed using a mutual fictitious efficiency $\varepsilon_{GF}$ connecting the geometric surface $S_{cal,M,I1}(\psi_M, \psi_{I1}, d)$ to the maximum collecting surface thereof: $\varepsilon_G \cdot S_{cal,M,I1}(\psi M, \psi_{I1}, d)$.

In a step E4, the communication device S determines a first value of a metric $\alpha_{RFSC}$ representative of an overlap between the collecting surface of the terminal device M and the collecting surface of the interfering device I1 at the current transmission frequency $f_c$.

It is assumed that the fictitious antenna connecting the terminal devices M and I1 is lossless, that is to say that the equivalent collecting surface is equal to the maximum equivalent collecting surface. Moreover, it is assumed that the aperture efficiency of the fictitious antenna is 1, in accordance with an aperture antenna. However, depending on the transmission conditions, the coefficient $\varepsilon_G$ can be less than 1. The overlap metric $\alpha_{RFSC}$ can therefore be calculated by taking into account the received power levels at the output of the antennas $A_M$ and $A_{I1}$, i.e. at the input of the RF (Radio Frequency) circuits as follows:

$$\alpha_{RFSC} = \frac{\varepsilon_{GF} \cdot S_{cal,M,I1}(\psi_M, \psi_{I1}, d)}{\frac{s_{c,M}(f_c, \psi_S) + s_{c,I1}(f_c, \psi_S)}{2}} \quad (2\text{-}3)$$

i.e, $$\alpha_{RFSC} = \frac{P_s \cdot D_S(\psi_{I1}) \cdot D_S(\psi_M))}{P_{R,M_{out}}(\psi_M, d) \cdot D_S(\psi_{I1}) + P_{R,I1_{out}}(\psi_{I1}, d) \cdot D_S(\psi_M)} \quad (2\text{-}4)$$

$$\varepsilon_{GF} \cdot \sin\left(\frac{\|\theta_M - \theta_{I1}\|}{2}\right) \cdot \left(1 - \cos\left(\frac{\|\theta_M - \theta_{I1}\|}{2}\right)\right)$$

Which can still be written, given equation 1-6:

$$\alpha_{RFSC} = \frac{P_s, in \cdot G_S(\psi_{I1}) \cdot G_S(\psi_M))}{P_{R,M\_out}(\psi_M, d) \cdot G_S(\psi_{I1}) + P_{R,I1\_out}(\psi_{I1}, d) \cdot G_S(\psi_M)} \quad (2\text{-}5)$$

$$\varepsilon_{GF} \cdot \sin\left(\frac{\|\theta_M - \theta_{I1}\|}{2}\right) \cdot \left(1 - \cos\left(\frac{\|\theta_M - \theta_{I1}\|}{2}\right)\right)$$

The numerical value of the overlap metric $\alpha_{RFSC}$ is simply deduced from the location of the terminal devices M and I1 ($\theta_M$ and $\theta_{I1}$), the knowledge of the input power $P_{s,in}$ of the communication device S, the antenna gain of the communication device S in the directions $\psi_{I1}$ and $\psi_M$, a measurement of the powers received at the input of the RF circuits of the terminal devices M and I1 and of an arbitrarily set value for $\varepsilon_G$.

In a step E5, the value of the recovery metric $\alpha_{RFSC}$ determined during step E4 is compared with a threshold $\beta$.

When the value of the overlap metric $\alpha_{RFSC}$ is strictly greater than the threshold $\beta$ then the terminal device M and the interfering device I1 are spatially dissociated and therefore interfere little or not at all. In other words, the collecting surfaces thereof do not overlap.

Thus, the terminal devices M and I1 can both receive the same radio signal transmitted at the same current transmission frequency $f_c$.

When the value of the overlap metric $\alpha_{RFSC}$ is less than or equal to the threshold $\beta$ then the terminal device M and the interfering device I1 interfere spatially.

It is therefore necessary to modify the current radio signal transmission frequency of the terminal M so as to reduce the collecting surface of the terminal device M.

Thus, in a step E6, a new current radio signal transmission frequency $f_{c,i}$ is selected from a set of possible transmission frequencies. The possible transmission frequencies can belong to different spectral bands, for example the spectral bands V and E if it is a radio signal transmitted in the millimetre band.

This current transmission frequency $f_{c,i}$ is used for a communication between the source device S and the terminal device M. In other words, when the current transmission frequency $f_{c,i}$ is used for a communication between the source device S and the terminal device M, the communication device S and the interfering device I1 communicate for example at the transmission frequency $f_c$.

In a particular embodiment, a transmission frequency $f_{c,j}$ of the radio signal is selected in addition to the transmission frequency $f_{c,i}$ during step E6. In this embodiment, the current transmission frequency $f_{c,j}$ is used for a communication between the source device S and the terminal device M while the communication device S and the interfering device I1 communicate with each other at the transmission frequency $f_{c,i}$.

Once the new transmission frequency $f_{c,j}$ called current frequency, of the radio signal has been selected, a new value of the overlap metric $\alpha_{RFSC}$ is calculated during a step E7.

The new value of the recovery metric $\alpha_{RFSC}$ is obtained using the following equivalent formula:

$$S_{cmax,M}(f_{c,j}, \psi_S) + S_{cmax,I1}(f_{c,i}, \psi_S) = \frac{c^2}{4\pi}\frac{D_M(\psi_S)}{f_{c,j}^2} + \frac{D_{I1}(\psi_S)}{f_{c,i}^2} \quad (2\text{-}6)$$

$$S_{c,M}(f_{c,j}, \psi_S) + S_{c,I1}(f_{c,i}, \psi_S) = \frac{c^2}{4\pi}\frac{G_M(\psi_S)}{f_{c,j}^2} + \frac{G_{I1}(\psi_S)}{f_{c,i}^2}$$

$$\alpha_{RFSC} = \varepsilon_{GF} \cdot \frac{2\pi \cdot d^2 \cdot \sin\left(\frac{\|\theta_M - \theta_{I1}\|}{2}\right) \cdot \left(1 - \cos\left(\frac{\|\theta_M - \theta_{I1}\|}{2}\right)\right)}{\frac{c^2}{8\pi}\left(\frac{G_M(\psi_S)}{f_{c,j}^2} + \frac{G_{I1}(\psi_S)}{f_{c,i}^2}\right)} \quad (2\text{-}7)$$

In a step E8, the new value of the recovery metric $\alpha_{RFSC}$ determined during step E7 is compared with the threshold $\beta$.

When the new value of the overlap metric $\alpha_{RFSC}$ is less than the threshold $\beta$ then the terminal devices M and I1 interfere spatially. In such a case, at least one new radio signal transmission frequency $f_{c,k}$ called current frequency, is selected from the set of possible transmission frequencies during a step E9. Steps E7 to E9 are repeated until the new value of the recovery metric $\alpha_{RFSC}$ is strictly greater than the threshold $\beta$.

When the value of the overlap metric $\alpha_{RFSC}$ is strictly greater than the threshold $\beta$ then the terminal device M and the interfering device I1 are spatially dissociated and therefore interfere little or not at all.

Steps E1 to E9 are executed repeatedly over time.

The proposed communication method can be advantageously implemented by a communication device S having a multiple antenna composed of several groups of elementary antennas, capable of transmitting at different frequencies. Each group of elementary antennas can transmit at a given transmission frequency, called current frequency, allowing implementing a known beam adjustment technique for the considered transmission frequency.

The proposed communication method can be combined with a method for adapting the weighting of elementary antennas which modifies the collecting surface of the receive multiple antenna.

The adjustment of the beam is performed by modifying the wavelength determining the collecting surface, that is to say the transmission frequency using a method for allocating multi-band transmission frequencies. Such a weighting adaptation method consists in selecting the transmission frequency, called current frequency, in a wide range of frequencies in connection with a calculation of the collecting surface of a receive antenna.

A massive multi-frequency MIMO antenna consisting of N elementary antennas distributed into NG groups of antennas operating on at most NG distinct transmission frequencies can be exploited to operate the change in transmission frequency and the modification of the collecting surface. Thus, according to the development, different frequencies can be selected depending on an overlap between collecting surfaces in order to simultaneously transmit radio signals, at these different frequencies, by the communication device to different terminals. In order to simultaneously transmit at different frequencies, the communications device includes different RF (radio frequency) circuits. The number of different RF circuits determines the number of different frequencies which can be simultaneously transmitted.

A SISO antenna can also be used with No frequencies included in the antenna bandwidth.

Figure 4:
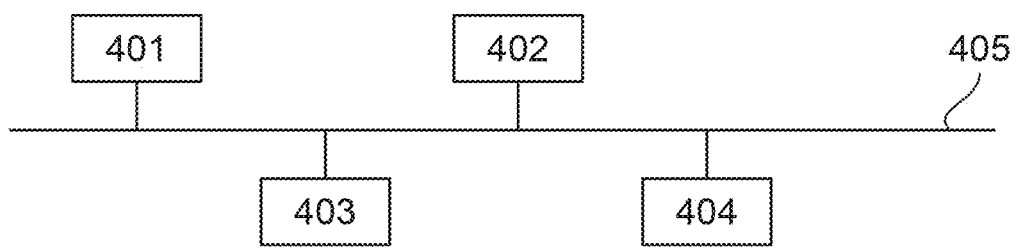
FIG. 4: this figure represents a communication device capable of implementing the different embodiments of the communication method.

FIG. 4 represents a communication device S capable of implementing the different embodiments of the communication method according to FIG. 3.

A communication device S can comprise at least one hardware processor 401, one storage unit 402, one interface 403, and at least one network interface 404 which are connected to each other through a bus 405. Of course, the elements constituting the communication device S can be connected by means of a connection other than a bus. Of course, the communication device S comprises at least one transmit/receive antenna and the RF circuit thereof. For a MIMO type antenna, the communication device can comprise several RF circuits to simultaneously transmit at different frequencies.

The processor 401 controls the operations of the communication device S. The storage unit 402 stores at least one program for the implementation of the method according to one embodiment to be executed by the processor 401, and various data, such as parameters used for calculations performed by the processor 401, intermediate data of calculations performed by the processor 401, etc. The processor 401 may be formed by any known and suitable hardware or software, or by a combination of hardware and software. For example, the processor 401 can be formed by a dedicated hardware such as a processing circuit, or by a programmable processing unit such as a Central Processing Unit which executes a program stored in a memory thereof.

The storage unit 402 may be formed by any appropriate means capable of storing the program(s) and data in a computer readable manner. Examples of storage unit 402 comprise non-transitory computer-readable storage media such as semiconductor memory devices, and magnetic, optical, or magneto-optical recording media loaded into a read and write unit.

The interface 403 provides an interface between the communication device S and other devices which are not represented in the figures.

At least one network interface 404 provides a connection between the communication device S and the terminal devices M and I1.

Figure 5:
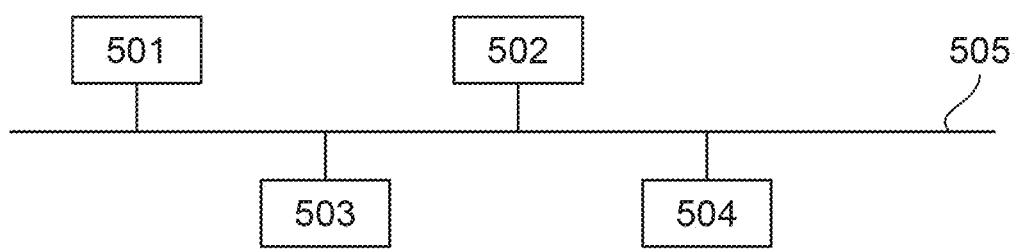
FIG. 5: this figure represents a terminal device M, I1 capable of implementing the different embodiments of the method for determining a collecting surface.

FIG. 5 represents a terminal device M, I1 capable of implementing the different embodiments of the method for determining a collecting surface according to FIG. 3.

A terminal device M, I1 can comprise at least one hardware processor 501, one storage unit 502, one interface 503, and at least one network interface 504 which are connected to each other through a bus 505. Of course, the constituent elements of the communication device S can be connected by means of a connection other than a bus. Of course, the terminal device M, I1 comprises at least one transmit/receive antenna and the RF circuit thereof.

The processor 501 controls the operations of the terminal device M, I1. The storage unit 502 stores at least one program for implementing the method according to one embodiment to be executed by the processor 501, and various data, such as parameters used for calculations performed by the processor 501, intermediate data of calculations performed by the processor 501, etc. The processor 501 may be formed by any known and suitable hardware or software, or by a combination of hardware and software. For example, the processor 501 can be formed by dedicated hardware such as a processing circuit, or by a programmable processing unit such as a Central Processing Unit which executes a program stored in a memory thereof.

The storage unit 502 may be formed by any suitable means capable of storing the program(s) and data in a computer readable manner. Examples of storage unit 402 comprise non-transitory computer-readable storage media such as semiconductor memory devices, and magnetic, optical, or magneto-optical recording media loaded into a read and write unit.

The interface 503 provides an interface between the terminal device M, I1 and other devices which are not represented in the figures.

At least one network interface 504 provides a connection between the terminal device M, I1 and the communication device S.

The invention claimed is:

1. A communication method between a communication device and at least one first terminal device according to a transmission frequency from several radio signal transmission frequencies, the communication method being implemented by the communication device and comprising:
   determining, for a given frequency from the several transmission frequencies, of a metric representative of an overlap between a first collecting surface of the first terminal device and a second collecting surface of at least one second terminal device, called interfering device;
   selecting a transmission frequency called current transmission frequency from the several radio signal transmission frequencies depending on the determined metric; and
   transmitting a radio signal to one of the two terminal devices at the current transmission frequency,
   wherein a transmission frequency used for a communication between the communication device and the other one of the two terminal devices is different from the current transmission frequency.

2. The communication method according to claim 1, wherein the method further comprises:
   determining the metric for another given frequency from the several transmission frequencies;
   selecting another transmission frequency called other current transmission frequency from the several radio signal transmission frequencies depending on the determined metric; and
   transmitting a radio signal to the interfering device at the other current transmission frequency,
   and wherein the transmission of a radio signal, at the current transmission frequency, is performed to the first terminal device.

3. The communication method according to claim 1, wherein the overlap metric further depends on the relative geometric positions of the terminal device and the interfering device.

4. The communication method according to claim 3, wherein the overlap metric is a ratio of a fictitious collecting surface determined depending on a geometric surface associated with the geometric positions of the first terminal device and the interfering device to a half sum of the first collecting surface and the second collecting surface respectively of the first terminal device and the interfering device.

5. The communication method according to claim 1, wherein the collecting surface of the first terminal device, respectively of the interfering device, is determined depending on a ratio of a value of a power of the radio signal received by the first terminal device, respectively by the interfering device to a product of a value of a transmission power of the radio signal and a parameter representative of directivity of the radio signal transmitted by the communication device, at the given radio signal transmission frequency.

6. The communication method according to claim 4, wherein the fictitious collecting surface is determined depending on a geometric surface, determined depending on geometric positions of the first terminal device and the interfering device relative to the communication device, and a fictitious efficiency.

7. The communication method according to claim 1, wherein when the overlap metric is less than or equal to a threshold, the current transmission frequency selected from the several frequencies is different from the given frequency.

8. The communication method according to claim 1, wherein when the overlap metric is greater than a threshold, the current transmission frequency selected from the several frequencies is equal to the given frequency.

9. A processing circuit comprising a processor and a memory, the memory storing program code instructions of a computer program for implementing the method according to claim 1, when the computer program is executed by the processor.

10. A communication device capable of communicating with at least one first terminal device according to a transmission frequency from several radio signal transmission frequencies, the communication device comprising means for:
    determining, for a given frequency from the several transmission frequencies, a metric representative of an overlap between a first collecting surface of the first terminal device and a second collecting surface of at least one second terminal device, called interfering device;
    selecting a transmission frequency called current transmission frequency, from the several radio signal transmission frequencies depending on the determined metric; and
    transmitting a radio signal to one of the two terminal devices at the current transmission frequency,
    wherein a transmission frequency used for a communication between the communication device and the other one of the two terminal devices is different from the current transmission frequency.

11. A communication system comprising at least one first terminal device, one second terminal device and a communication device, the communication device comprising means for:
    determining, for a given frequency from the several transmission frequencies, a metric representative of an overlap between a first collecting surface of the first terminal device and a second collecting surface of the second terminal device, called interfering device;
    selecting a transmission frequency called current transmission frequency from the several radio signal transmission frequencies depending on the determined metric; and
    transmitting a radio signal to one of the two terminal devices at the current transmission frequency, wherein a transmission frequency used for a communication between the communication device and the other one of the two terminal devices is different from the current transmission frequency, and wherein at least one of the two terminal devices comprising means for:

determining a collecting surface of the at least one of the two terminal devices depending on a ratio of a value of a power of the radio signal received by the at least one of the two terminal devices at the given radio signal transmission frequency, to a product of a value of a transmission power of the radio signal and a parameter representative of directivity of the radio signal transmitted by the communication device; and transmitting the collecting surface of the at least one of the two terminal devices thus determined to the communication device.

\* \* \* \* \*